United States Patent
Fujita (10) Patent No.: US 10,502,962 B2
(45) Date of Patent: Dec. 10, 2019

(54) PROJECTION TYPE DISPLAY DEVICE AND PROJECTION CONTROL METHOD

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 94 days.

(21) Appl. No.: 15/861,663

(22) Filed: Jan. 3, 2018

(65) Prior Publication Data
US 2018/0143443 A1    May 24, 2018

Related U.S. Application Data

(63) Continuation of application No. PCT/JP2016/064712, filed on May 18, 2016.

(30) Foreign Application Priority Data

Jul. 29, 2015    (JP) .................................. 2015-149989

(51) Int. Cl.
    *G02B 27/01* (2006.01)
    *B60K 35/00* (2006.01)
(52) U.S. Cl.
    CPC .......... *G02B 27/0179* (2013.01); *B60K 35/00* (2013.01); *G02B 27/0101* (2013.01);
    (Continued)
(58) Field of Classification Search
    CPC ................ G02B 27/0179; G02B 27/01; G02B 27/0101; G02B 2027/0118;
    (Continued)

(56) References Cited

U.S. PATENT DOCUMENTS

| 6,327,522 B1 | 12/2001 | Kojima et al. |
| 2003/0151563 A1* | 8/2003 | Kulas .................... B60K 35/00 345/7 |

(Continued)

FOREIGN PATENT DOCUMENTS

| JP | H05124457 | 5/1993 |
| JP | H06233306 | 8/1994 |

(Continued)

OTHER PUBLICATIONS

"International Search Report (Form PCT/ISA/210)" of PCT/JP2016/064712, dated Aug. 2, 2016, with English translation thereof, pp. 1-5.

(Continued)

*Primary Examiner* — Liliana Cerullo
(74) *Attorney, Agent, or Firm* — JCIPRNET (57) ABSTRACT

The projection type display device includes a projection display unit that includes light sources, a light modulation element, and a projection unit that projects light onto a projection surface mounted in a vehicle as projection light; a sight line detection unit that detects a line of sight of a driver of the vehicle; and a system controller that performs a control so that a projection condition in a state where the line of sight detected by the sight line detection unit is out of the projection surface becomes a first condition and changes the projection condition when it is determined that the line of sight moves from the outside of the projection surface to the inside of the projection surface into a second condition that visibility of an image based on the projection light is higher than that in the first condition.

16 Claims, 5 Drawing Sheets

(52) U.S. Cl.
CPC .. *B60K 2370/155* (2019.05); *B60K 2370/193* (2019.05); *B60K 2370/334* (2019.05); *B60K 2370/52* (2019.05); *G02B 2027/014* (2013.01); *G02B 2027/0118* (2013.01); *G02B 2027/0181* (2013.01); *G02B 2027/0187* (2013.01)

(58) Field of Classification Search
CPC ...... G02B 2027/014; G02B 2027/0181; G02B 2027/0187; G06F 3/147; G03B 17/154; B60K 35/00; G09G 5/00; G09G 5/02; G09G 5/10; G09G 5/36; G09G 2320/0261; G09G 2340/04; G09G 2380/10; H04N 9/3194; H04N 9/3179; B06K 2370/1529; B06K 2370/149; B06K 2370/186; B06K 2370/193; B06K 2370/52; B06K 2370/334; B06K 2370/155

See application file for complete search history.

(56) References Cited

U.S. PATENT DOCUMENTS

| | | | |
|---|---|---|---|
| 2006/0071877 A1* | 4/2006 | Kanamori | G02B 17/023 345/7 |
| 2007/0085708 A1 | 4/2007 | Kato et al. | |
| 2012/0027376 A1 | 2/2012 | Takase et al. | |
| 2012/0075708 A1* | 3/2012 | Hagiwara | B60K 35/00 359/630 |
| 2013/0097557 A1* | 4/2013 | Madau | A61B 5/18 715/810 |
| 2016/0185219 A1* | 6/2016 | Sakata | G08G 1/16 701/36 |

FOREIGN PATENT DOCUMENTS

| | | |
|---|---|---|
| JP | H07144557 | 6/1995 |
| JP | H07257228 | 10/1995 |
| JP | 2001071843 | 3/2001 |
| JP | 2003004460 | 1/2003 |
| JP | 2006327310 | 12/2006 |
| JP | 2007131291 | 5/2007 |
| JP | 2012029216 | 2/2012 |
| JP | 2012030703 | 2/2012 |
| JP | 2012226067 | 11/2012 |
| JP | 2015-101189 | 6/2015 |

OTHER PUBLICATIONS

"International Preliminary Report on Patentability (Form PCT/IPEA/409) of PCT/JP2016/064712", dated May 26, 2017, with English translation thereof, pp. 1-20.

"Office Action of Japan Counterpart Application," dated Feb. 13, 2018, with English translation thereof, p. 1-p. 8.

* cited by examiner

| | | PROJECTION CONDITION | | | | |
|---|---|---|---|---|---|---|
| | | BRIGHTNESS OF PROJECTION IMAGE | SATURATION OF PROJECTION IMAGE | SIZE OF PROJECTION IMAGE | DISTANCE TO VIRTUAL IMAGE | POSITION OF PROJECTION IMAGE |
| FIRST CONDITION | | 10% OF STANDARD BRIGHTNESS | 10% OF STANDARD SATURATION | 10% OF STANDARD SIZE | STANDARD DISTANCE + $\alpha 1$ | MOVE BY $\beta 1$ FROM STANDARD POSITIONS TOWARD END PORTION SIDES |
| SECOND CONDITION | SUB CONDITION (a) | 30% OF STANDARD BRIGHTNESS | 30% OF STANDARD SATURATION | 30% OF STANDARD SIZE | STANDARD DISTANCE + $\alpha 2$ ($\alpha 2 < \alpha 1$) | MOVE BY $\beta 2$ ($\beta 2 < \beta 1$) FROM STANDARD POSITIONS TOWARD END PORTION SIDES |
| | SUB CONDITION (b) | 60% OF STANDARD BRIGHTNESS | 60% OF STANDARD SATURATION | 60% OF STANDARD SIZE | STANDARD DISTANCE + $\alpha 3$ ($\alpha 3 < \alpha 2$) | MOVE BY $\beta 3$ ($\beta 3 < \beta 2$) FROM STANDARD POSITIONS TOWARD END PORTION SIDES |
| | SUB CONDITION (c) | STANDARD BRIGHTNESS | STANDARD SATURATION | STANDARD SIZE | STANDARD DISTANCE | STANDARD POSITION |

PROJECTION TYPE DISPLAY DEVICE AND PROJECTION CONTROL METHOD

CROSS-REFERENCE TO RELATED APPLICATIONS

This application is a Continuation of PCT International Application No. PCT/JP2016/064712 filed on May 18, 2016, which claims priority under 35 U.S.C § 119(a) to Japanese Patent Application No. 2015-149989 filed on Jul. 29, 2015. Each of the above application(s) is hereby expressly incorporated by reference, in its entirety, into the present application.

BACKGROUND OF THE INVENTION

1. Field of the Invention

The present invention relates to a projection type display device and a projection control method.

2. Description of the Related Art

Inside a vehicle such as an automobile, a train, a heavy machine, an aircraft, or a ship, a vehicle head-up display (HUD) that projects, using a combiner disposed in a front windshield or in the vicinity of the front windshield as a screen, light to the screen to display an image is known (see JP1995-257228A (JP-H07-257228A) and JP2006-327310A). In a case where such an HUD is used, a user (for example, a driver) who is present inside the vehicle may visually recognize an image based on projection light projected from the HUD as a real image on the screen or as a virtual image in front of the screen.

JP1995-257228A (JP-H07-257228A) discloses a vehicle HUD that detects a line of sight of a driver and projects light based on image information onto a projection surface only in a case where a sight line direction is present on a path in front of a vehicle.

JP2006-327310A discloses an HUD that controls a spatial frequency of an image based on projection light so as not to cause focus adjustment reaction of a driver.

SUMMARY OF THE INVENTION

The height of a person, a posture thereof when seated on a driver's seat, or the like varies according to drivers. However, in an HUD, a predetermined region is assumed around the position of the eyes of a representative driver, and a projection range of projection light toward a projection surface is set so that a driver can visually recognize a real image or a virtual image satisfactorily as long as the eyes of the driver are present in the predetermined region.

In a state where the projection range of the light and a line of sight of the driver intersect each other, the driver can visually recognize the real image or the virtual image. On the other hand, in a state where the projection range of the projection light and the line of sight of the driver do not intersect each other, the driver cannot visually recognize the real image or the virtual image. During driving of the vehicle, it is necessary to pay attention to a wide range on a front side in a traveling direction, and thus, a state where the projection range of the projection light and the line of sight of the driver do not intersect each other may occur.

In a case where the driver deviates the line of sight from the projection range, and then, returns the line of sight to the projection range, there is a possibility that the driver focuses on the real image or the virtual image based on the light projected to the projection range, rather than a front situation in the projection range, and thus, it takes time until the front situation is recognized.

The HUD disclosed in JP1995-257228A (JP-H07-257228A) has a configuration in which in a case where the line of sight directs toward the path in front of the vehicle from the state where the line of sight is out of the path in front of the vehicle, the light based on the image information is directly projected onto the projection surface. Thus, when the line of sight of the driver returns to the path in front of the vehicle, the driver cannot avoid focusing on the real image or the virtual image capable of being directly visually recognized, and thus, it may take time until the situation of the path in front of the vehicle is recognized.

JP2006-327310A does not consider an operation in a case where the line of sight deviates from the projection range.

The invention has been made in consideration of the above-mentioned problems, and an object of the invention is to provide a projection type display device and a projection control method capable of accurately recognizing a situation in a traveling direction even in a situation where a line of sight of a driver complicatedly changes.

According to an aspect of the invention, there is provided a projection type display device comprising: a projection display unit that includes a light source, a light modulation element that spatially modulates light emitted from the light source, and a projection unit that projects light spatially modulated by the light modulation element onto a projection surface mounted in a vehicle as projection light; a sight line detection unit that detects a line of sight of a driver of the vehicle; and a projection controller that performs a control so that a projection condition for the projection of the projection light onto the projection surface in the projection display unit becomes a first condition in a case where the line of sight detected by the sight line detection unit is out of the projection surface, and performs a control so that the projection condition becomes a second condition that visibility of an image based on the projection light is higher than that in the first condition in a case where it is determined that the line of sight detected by the sight line detection unit moves from the outside of the projection surface to the inside of the projection surface; wherein the projection controller changes the projection condition from the first projection condition to the second projection condition, after a first time of range between 1 and 4 seconds elapses from a point in time when the projection controller determines that the line of sight detected by the sight line detection unit moves from the outside of the projection surface to the inside of the projection surface According to another aspect of the invention, there is provided a projection control method in a projection type display device including a projection display unit that includes a light source, a light modulation element that spatially modulates light emitted from the light source, and a projection unit that projects light spatially modulated by the light modulation element onto a projection surface mounted in a vehicle as projection light; and a sight line detection unit that detects a line of sight of a driver of the vehicle, the method comprising: a projection control step of performing a control so that a projection condition for the projection of the projection light onto the projection surface in the projection display unit becomes a first condition in a case where the line of sight detected by the sight line detection unit is out of the projection surface, and performing a control so that the projection condition becomes a second condition that visibility of an image based on the projection light is higher than that in the first condition in a case where it is determined that the line of sight detected by the sight line detection unit moves from the outside of the projection surface to the inside of the projection surface, after a first time of range between 1 and 4 seconds elapses from a point in time when the projection controller determines that the line of sight detected by the sight line detection unit moves from the outside of the projection surface to the inside of the projection surface.

According to the invention, it is possible to provide a projection type display device and a projection control method capable of accurately recognizing a situation in a traveling direction even in a situation where a line of sight of a driver is complicatedly changed.

DESCRIPTION OF THE PREFERRED EMBODIMENTS

Hereinafter, embodiments of the invention will be described with reference to the accompanying drawings.

Figure 1:
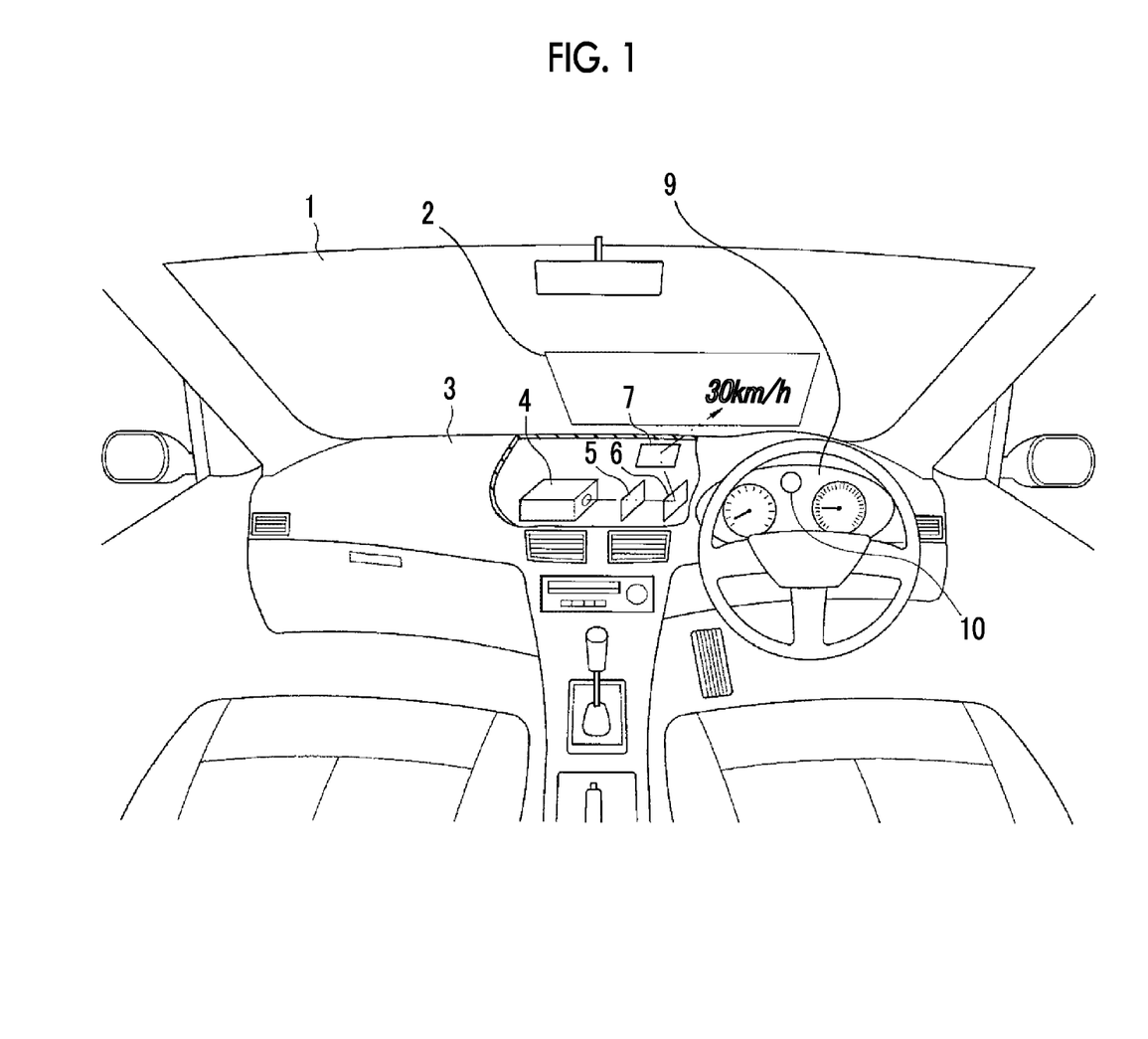
FIG. 1 is a conceptual diagram showing a configuration of an HUD according to an embodiment of a projection type display device of the invention.

FIG. 1 is a diagram showing a schematic configuration of an HUD according to an embodiment of a projection type display device of the invention. The HUD is mounted on an automobile, and causes, using a partial range of a front windshield 1 as a projection surface 2 of light, a driver of the automobile to visually recognize a virtual image formed by the light projected onto the projection surface 2. The HUD in FIG. 1 may be mounted and used in a vehicle such as a train, a heavy machine, a construction machine, an aircraft, or a ship, as well as an automobile.

The HUD shown in FIG. 1 includes a light source unit 4 that is provided in a dashboard 3 of an automobile, a diffuser plate 5, a reflecting mirror 6 and a magnifying glass 7 that are provided in the dashboard 3, and an imaging unit 10 that is attached to a gauge board 9 that is provided on a driver's seat side of the dashboard 3.

The diffuser plate 5 diffuses light emitted from the light source unit 4 to make a plane light source. The reflecting mirror 6 reflects the light that is diffused to the plane light source by the diffuser plate 5 toward the magnifying glass 7. The magnifying glass 7 magnifies the light from the reflecting mirror 6, and projects the magnified light to the projection surface 2 that is a partial range of the front windshield 1. The projection surface 2 is processed such that the light projected from the magnifying glass 7 is reflected toward the eyes of a driver. Here, a configuration in which light is projected onto the front windshield 1 is shown, but a configuration in which light is projected onto a combiner that is disposed in the vicinity of the front windshield 1 may be used. In this case, the combiner forms the projection surface 2.

A driver of an automobile may visually recognize pictures, characters or the like of information relating to driving using a virtual image based on light that is projected onto the projection surface 2 and is reflected from the projection surface 2. Further, the projection surface 2 has a function of transmitting light from the outside of the front windshield 1 (external side of the car). Thus, the driver may visually recognize an image obtained by superimposing a virtual image based on the light projected from the magnifying glass 7 and a scene of the outside world.

The imaging unit 10 attached to the gauge board 9 images the face of the driver who is sits on a driver's seat, and is connected to the light source unit 4 in a wired or wireless manner. Data on a captured image of the face of the driver obtained by the imaging unit 10 is transmitted to the light source unit 4 in a wired or wireless manner.

The imaging unit 10 may be attached to a location other than the gauge board 9 as long as the face of the driver can be imaged at the location. As the imaging unit 10, an imaging unit that is provided for usage different from that of the HUD in the automobile may be used.

Figure 2:
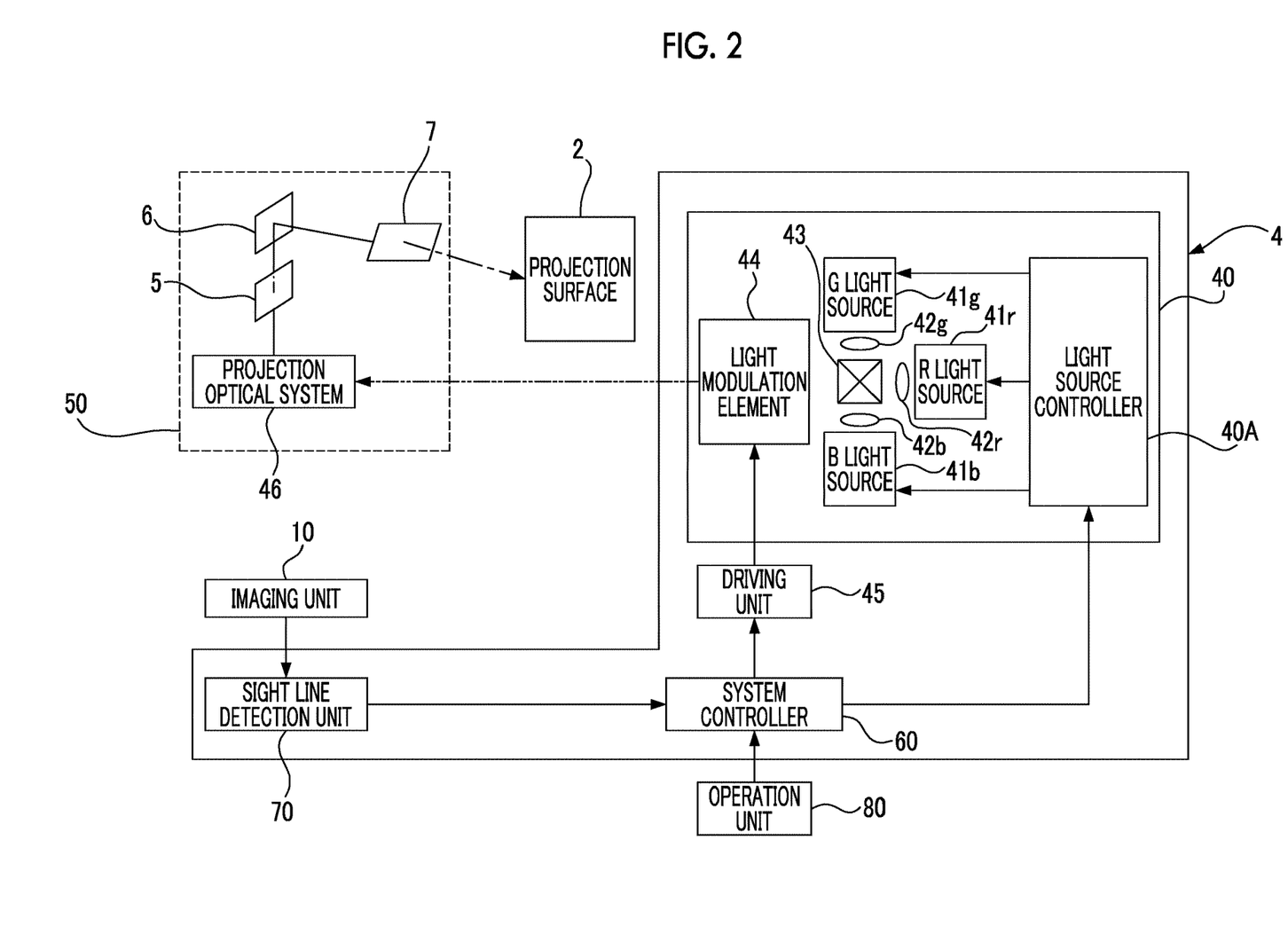
FIG. 2 is a schematic diagram showing a detailed configuration of the HUD shown in FIG. 1.

FIG. 2 is a schematic diagram showing a detailed configuration of the HUD shown in FIG. 1.

As shown in FIG. 2, the HUD includes the projection surface 2, the light source unit 4, a projection unit 50, the imaging unit 10, and an operation unit 80.

The light source unit 4 includes a light source unit 40, a driving unit 45 that drives a light modulation element 44 included in the light source unit 40, a system controller 60 that generally controls the entire system, and a sight line detection unit 70. The system controller 60 functions as a projection controller.

The light source unit 40 includes a light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, a collimator lens 42b that is provided between the B light source 41b and the dichroic prism 43, and a light modulation element 44. The R light source 41r, the G light source 41g, and the B light source 41b form light sources of the HUD.

The dichroic prism 43 is an optical member for guiding light emitted from each of the R light source 41r, the G light source 41g, and the B light source 41b to the same optical path. The dichroic prism 43 transmits red light that is collimated by the collimator lens 42r to be emitted to the light modulation element 44. Further, the dichroic prism 43 reflects green light that is collimated by the collimator lens 42g to be emitted to the light modulation element 44. Further, the dichroic prism 43 reflects blue light that is collimated by the collimator lens 42b to be emitted to the light modulation element 44. An optical member having a function of guiding light to the same optical path is not limited to a dichroic prism. For example, a cross dichroic mirror may be used.

The R light source 41r, the G light source 41g, and the B light source 41b respectively employ a light emitting element such as laser or a light emitting diode. In this embodiment, an example in which the HUD includes three light sources of the R light source 41r, the G light source 41g, and the B light source 41b is shown, but the number of light sources may be 1, 2, 4 or more.

The light source controller 40A sets the amounts of luminescence of the R light source 41r, the G light source 41g, and the B light source 41b into predetermined luminescence amount patterns, and performs a control for sequentially emitting light from the R light source 41*r*, the G light source 41*g*, and the B light source 41*b* according to the luminescence amount patterns.

The light modulation element 44 spatially modulates light emitted from the dichroic prism 43 on the basis of projection image data that is image information, and emits light (red color image light, blue color image light, and green color image light) based on the projection image data to the projection unit 50. The image information includes, for example, information indicating a traveling speed of an automobile, information for performing notification to a driver, navigation information, or the like.

The light modulation element 44 may employ, for example, a liquid crystal on silicon (LCOS), a digital micromirror device (DMD), a micro electro mechanical systems (MEMS) element, a liquid crystal display device, or the like.

The driving unit 45 drives the light modulation element 44 according to projection image data input through the system controller 60, and emits light based on the projection image data to the projection unit 50.

The projection unit 50 includes a projection optical system 46, the diffuser plate 5, the reflecting mirror 6, and the magnifying glass 7.

The projection optical system 46 is an optical system for projecting light that is spatially modulated by the light modulation element 44 onto the diffuser plate 5. The optical system is not limited to a lens, and may employ a scanner.

The projection unit 50 forms a projection unit that projects the light that is spatially modulated by the light modulation element 44 onto the projection surface 2. The projection surface 2 becomes a projection range of light (hereinafter, referred to as projection light) projected by the projection unit 50. The projection unit 50 is optically designed so that an image based on the light projected onto the projection surface 2 can be visually recognized by a driver as a virtual image at a position in front of the front windshield 1.

The light sources including the R light source 41*r*, the G light source 41*g* and the B light source 41*b*, the light modulation element 44, and the projection unit 50 form a projection display unit.

The system controller 60 controls the light source controller 40A and the driving unit 45, and emits light based on the projection image data to the projection unit 50 from the light source unit 40.

The sight line detection unit 70 acquires captured image data obtained by imaging of the imaging unit 10, and performs a known sight line detection process with respect to data of the acquired captured image to detect a line of sight of a driver of an automobile in which an HUD is mounted. The sight line detection unit 70 notifies the system controller 60 of the sight line detection result.

The operation unit 80 includes a display (for example, a touch panel display disposed in a center console) and operation buttons, and the like that are mounted in an automobile, and is an interface for causing the system controller 60 to perform various instructions.

The system controller 60 determines whether a line of sight of a driver is present or not in the projection range (projection surface 2) of light toward the front windshield 1 in the projection unit 50, on the basis of the sight line detection result of the sight line detection unit 70.

In a case where the line of sight is within the projection surface 2, the line of sight detected by the sight line detection unit 70 intersects the projection surface 2. In a case where the line of sight is out of the projection surface 2, the line of sight detected by the sight line detection unit 70 does not intersect the projection surface 2.

In a state where the line of sight of the driver is out of the projection surface 2, the system controller 60 performs a control so that a projection condition for the projection of the projection light onto the projection surface 2 in the projection display unit becomes a first condition, and projects the projection light by the projection display unit according to the first condition. Further, in a case where it is determined that the line of sight of the driver is within the projection surface 2, the system controller 60 performs a control so that the projection condition becomes a second condition that visibility of an image (hereinafter, referred to as a projection image) based on light projected onto the projection surface 2 by the projection display unit is higher than that in the first condition, and projects the projection light by the projection display unit according to the second condition.

In this way, the system controller 60 selects the first condition or the second condition according to whether the line of sight of the driver is within the projection surface 2, and performs a control so that visibility of a projection image based on light projected by the projection display unit is changed.

Figure 3:
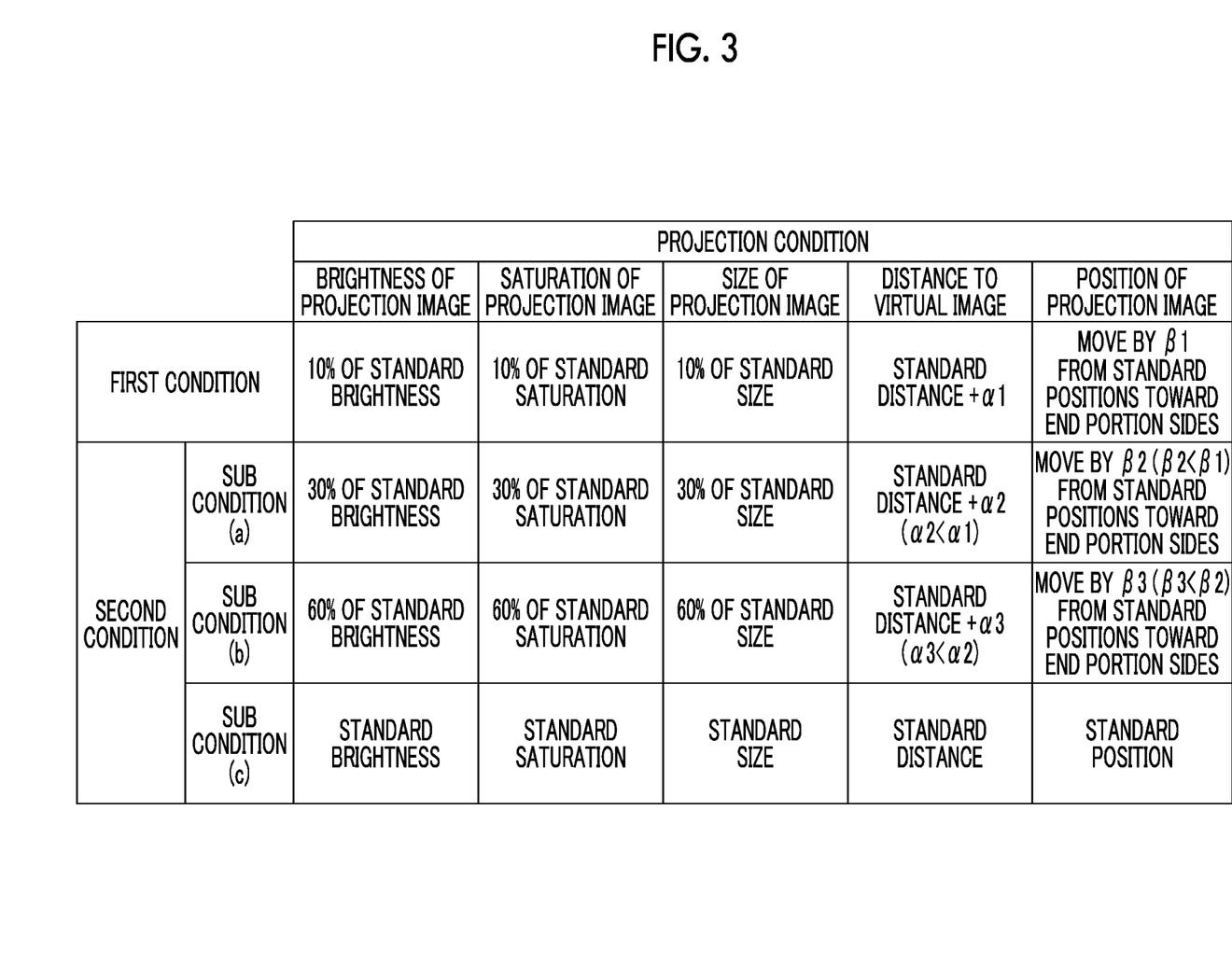
FIG. 3 is a diagram showing an example of a projection condition.

FIG. 3 is a diagram showing an example of the first condition and the second condition of the projection conditions set by the system controller 60.

The projection conditions include at least one of brightness of a projection image, saturation of the projection image, the size of the projection image, a distance between an imaging position of a virtual image and the projection surface 2 in a state where the projection image can be visually recognized as the virtual image (distance to the virtual image), or the position of the projection image.

The size of the projection image refers to the size of an individual image of various icons, characters, or the like included in the projection image.

The position of the projection image refers to the position, in the entire projection image, of an individual image of various icons, characters, or the like included in the projection image.

As shown in FIG. 3, the projection condition of the brightness of the projection image, the saturation of the projection image, the size of the projection image, the distance to the virtual image, and the position of the projection image include the first condition and the second condition, respectively. Further, the second condition includes three sub conditions (a), (b), and (c) having different visibilities of the projection image.

With respect to the brightness of the projection image, a first condition in which the brightness of the projection image is set to 10% of a predetermined standard brightness, a second condition (sub condition (a)) in which the brightness of the projection image is set to 30% of the standard brightness, a second condition (sub condition (b)) in which the brightness of the projection image is set to 60% of the standard brightness, and a second condition (sub condition (c)) in which the brightness of the projection image is set to the standard brightness, may be set. The visibility of the projection image is more highly enhanced as the brightness becomes higher. Thus, in the sub conditions included in the second condition with respect to the brightness, the visibility of the projection image becomes higher in the order of the sub condition (a), the sub condition (b), and the sub condition (c).

The system controller 60 sets the brightness of the projection image to the first condition or the second condition by changing the brightness in projection image data corresponding to a virtual image to be presented to a driver. Alternatively, the system controller 60 may set the brightness of the projection image to the first condition or the second condition by changing the intensity of light emitted by a light source, without changing the projection image data corresponding to the virtual image to be presented to the driver.

With respect to the saturation of the projection image, a first condition in which the saturation of the projection image is set to 10% of a predetermined standard saturation, a second condition (sub condition (a)) in which the saturation of the projection image is set to 30% of the standard saturation, a second condition (sub condition (b)) in which the saturation of the projection image is set to 60% of the standard saturation, and a second condition (sub condition (c)) in which the saturation of the projection image is set to the standard saturation, may be set. The visibility of the projection image is more highly enhanced as the saturation becomes higher. Accordingly, in the sub conditions included in the second condition with respect to the saturation, the visibility of the projection image becomes higher in the order of the sub condition (a), the sub condition (b), and the sub condition (c).

The system controller 60 sets the saturation of the projection image to the first condition or the second condition by changing the saturation in projection image data corresponding to a virtual image to be presented to a driver. Alternatively, the system controller 60 may set the saturation of the projection image to the first condition or the second condition by changing the intensity of light emitted from a light source, without changing the projection image data corresponding to the virtual image to be presented to the driver.

With respect to the size of the projection image, a first condition in which the size of the projection image is set to 10% of a predetermined standard saturation, a second condition (sub condition (a)) in which the size of the projection image is set to 30% of the standard size, a second condition (sub condition (b)) in which the size of the projection image is set to 60% of the standard size, and a second condition (sub condition (c)) in which the size of the projection image is set to the standard size, may be set. The visibility of the individual image included in the projection image is more highly enhanced as the size becomes larger. Accordingly, in the sub conditions included in the second condition with respect to the size of the projection image, the visibility of the projection image becomes higher in the order of the sub condition (a), the sub condition (b), and the sub condition (c).

The system controller 60 sets the size of the projection image to the first condition or the second condition by generating projection image data obtained by changing sizes of various icons or the like in projection image data corresponding to a virtual image to be presented to a driver and inputting the generated projection image data to the driving unit 45.

With respect to the distance to the virtual image, a first condition in which the distance to the virtual image is set to a value obtained by adding a distance α1 to a predetermined standard distance, a second condition (sub condition (a)) in which the distance to the virtual image is set to a value obtained by adding a distance $\alpha 2$ ($<\alpha 1$) to the standard distance, a second condition (sub condition (b)) in which the distance to the virtual image is set to a value obtained by adding a distance $\alpha 3$ ($<\alpha 2$) to the standard distance, and a second condition (sub condition (c)) in which the distance to the virtual image is set to the standard distance, may be set. Since the virtual image looks bigger as the imaging position of the virtual image is closer to the projection surface 2, the visibility is enhanced. Accordingly, in the sub conditions included in the second condition with respect to the distance to the virtual image, the visibility of the projection image becomes higher in the order of the sub condition (a), the sub condition (b), and the sub condition (c).

In a case where the distance to the virtual image is changed, the length of the optical path of the optical system in the projection unit 50 is made variable. Accordingly, the system controller 60 sets the distance to the virtual image to the first condition or the second condition by controlling the length of the optical path.

With respect to the position of the projection image, a first condition in which the position of an individual image of various icons, or the like included in a projection image is set to a position which is from predetermined standard positions by distance β1 toward end portion sides of the projection surface 2, a second condition (sub condition (a)) in which the position of the individual image is set to a position which is from standard positions by distance $\beta 2$ ($<\beta 1$) toward the end portion sides of the projection surface 2, a second condition (sub condition (b)) in which position of the individual image is set to a position which is from the standard positions by distance $\beta 3$ ($<\beta 2$) toward the end portion sides of the projection surface 2, and a second condition (sub condition (c)) in which the position of the individual image is set to the standard positions, may be set.

Figure 4:
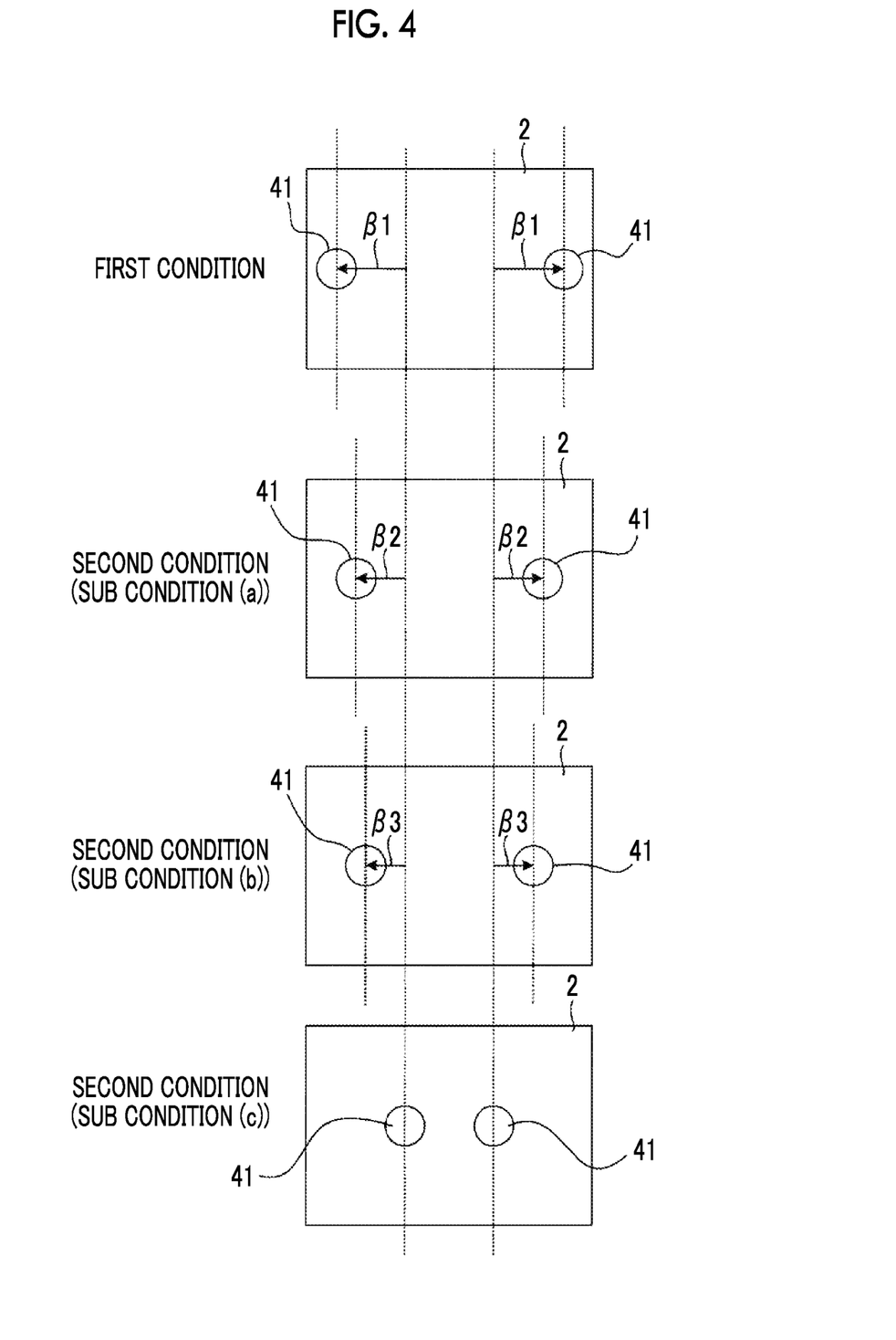
FIG. 4 is an image view of a projection image projected by a first condition and a second condition when the projection condition corresponds to a projection image position.

FIG. 4 is an image view of projection images projected under the first condition and the second condition in a case where the projection condition is the position of the projection image. As shown in FIG. 4, the projection image projected under the sub condition (c) has icons 41 that are disposed at standard positions. The projection image projected under the sub condition (b) has icons 41 that are disposed at positions that move by β3 in a horizontal direction toward end portion sides of the projection surface 2 with respect to the standard positions. The projection image projected under the sub condition (a) has icons 41 that are disposed at positions that move by β2 in the horizontal direction toward the end portion sides of the projection surface 2 with respect to the standard positions. The projection image projected under the first condition has icons 41 that moves by β1 in the horizontal direction toward the end portion sides of the projection surface 2 with respect to the standard positions.

Since it is harder for an individual image included in a projection image to enter a field of vision of a driver as shown in FIG. 4 as it is closer to end portions (end portions of the projection surface 2) in the entire projection image, the visibility is lowered. Accordingly, in the sub conditions included in the second condition with respect to the position of the projection image, the visibility of the projection image becomes higher in the order of the sub condition (a), the sub condition (b), and the sub condition (c).

The system controller 60 sets the position of the projection image to the first condition or the second condition by generating projection image data obtained by changing positions of various icons or the like with respect to projection image data corresponding to a virtual image to be presented to a driver and inputting the generated projection image data to the driving unit 45.

In a case where the system controller 60 changes the projection condition from the first condition to the second condition, the system controller 60 sequentially changes from the sub condition (a) having low visibility to the sub condition (c) having high visibility, and performs a control for gradually enhancing the visibility.

Figure 5:
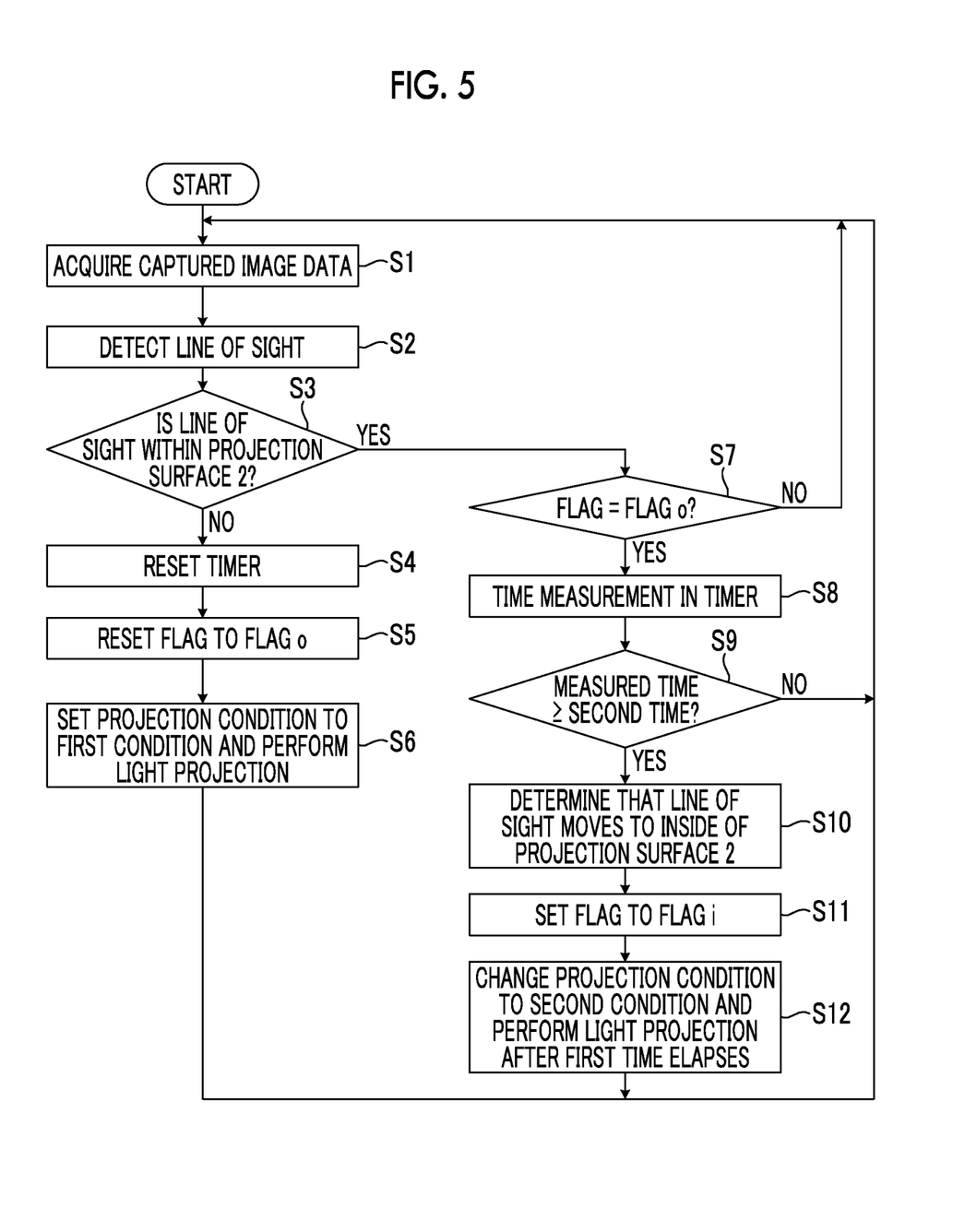
FIG. 5 is a flowchart for illustrating an operation of the HUD shown in FIG. 1.

FIG. 5 is a flowchart illustrating an operation of the HUD shown in FIG. 1.

In a case where the HUD is started, the system controller 60 starts projection of light onto the projection surface 2 in the projection display unit. The system controller 60 sets the projection condition to the second condition (the sub condition (c)) in starting. After starting of light projection, the sight line detection unit 70 acquires captured image data captured by the imaging unit 10 (step S1).

Thereafter, the sight line detection unit 70 detects a line of sight of a driver on the basis of the captured image data acquired in step S1 (step S2).

After step S2, the system controller 60 determines whether the line of sight of the driver detected by the sight line detection unit 70 is within the projection surface 2 (step S3). In a case where it is determined that the line of sight of the driver is out of the projection surface 2 (NO in step S3), the system controller 60 resets an internal timer (step S4).

After step S4, the system controller 60 sets a flag stored in an internal memory to "flag o" indicating a state where the line of sight is out of the projection surface 2 (step S5), sets the projection condition to the first condition, and causes the projection display unit to perform light projection according to the first condition (step S6). After the process of step S6, the procedure returns to the process of step S1.

In a case where it is determined in step S3 that the line of sight of the driver is within the projection surface 2 (YES in step S3), the system controller 60 determines whether the flag in the internal memory is set to "flag o" (step S7).

In a case where the flag in the internal memory is set to "flag i" indicating a state where the line of sight is within the projection surface 2 (NO in step S7), the procedure returns to the process of step S1.

In a case where the flag in the internal memory is set to "flag o" (YES in step S7), the system controller 60 starts time measurement in the internal timer (step S8).

Then, the system controller 60 determines, with reference to a measured time of the internal timer, whether the measured time is equal to or longer than a second time (for example, 1 second) (step S9).

In a case where the measured time of the internal timer is shorter than the second time (NO in step S9), the procedure returns to step S1, and then, the above-described processes are repeated.

In a case where the measured time of the internal timer is equal to or longer than the second time (YES in step S9), the system controller 60 determines that the line of sight of the driver moves from the outside of the projection surface 2 to the inside of the projection surface 2 (step S10), and then, sets the flag of the internal memory to "flag i" (step S11).

For example, a driver may confirm a rearview mirror or a side mirror in changing of a traffic lane, for example, and under such a situation where the line of sight is complicatedly changed, the driver repeats turning the line of sight into the projection surface 2 and turning the line of sight out of the projection surface 2.

In this way, under the situation where the line of sight greatly moves, in a case where the projection condition of the light in the projection display unit is changed just because the line of sight moves from the outside of the projection surface 2 to the inside of the projection surface 2, in a case where the line of sight immediately moves out of the projection surface 2, the projection condition is changed again. That is, the projection condition of the light is frequently changed.

In order to prevent such a problem, the system controller 60 determines, only in a case where the line of sight of the driver enters the projection surface 2 from the state of being out of the projection surface 2 and the state where the line of sight is within the projection surface 2 is continued for the second time (YES in step S9), that the line of sight of the driver moves from the outside of the projection surface 2 to the inside of the projection surface 2.

Further, after it is determined that the line of sight of the driver moves from the outside of the projection surface 2 to the inside of the projection surface 2, and after a first time (for example, about 1 second to 4 seconds) elapses, the system controller 60 changes the projection condition from the first condition to the second condition, and causes the projection display unit to perform projection of projection light according to the second condition (step S12).

In step S12, the system controller 60 first sets the sub condition (a) of the second condition, sets the sub condition (b) of the second condition, and then, sets the sub condition (c) of the second condition. Thus, in a virtual image that is visually recognized through a projection image, in a case where the projection condition is brightness, for example, the brightness of the virtual image gradually becomes higher to return to a standard brightness. After the process of step S12, the procedure returns to step S1.

As described above, when the HUD shown in FIG. 1 is used, in a case where a line of sight of a driver is out of the projection surface 2, projection of projection light onto the projection surface 2 is performed under the first projection condition. Further, at a point of time when the line of sight of the driver moves from the outside of the projection surface 2 to the inside of the projection surface 2, the driver enters a state where the visibility is low, and a virtual image is presented to the driver. Thus, it is possible to reduce a possibility that the driver focuses on the virtual image, and to cause the driver to accurately recognize a situation in a traveling direction.

Further, when the HUD shown in FIG. 1 is used, even in a case where the line of sight of the driver moves from the outside of the projection surface 2 to the inside of the projection surface 2, until the first time elapses, the projection condition is not changed. Thus, during the first time when the virtual image with low visibility is presented, the driver can sufficiently confirm a front visual field, and can accurately recognize a situation in a traveling direction. The first time may be determined as an appropriate value on the basis of human engineering, or may be set to a period of time of about 1 second to 4 seconds as described above.

Further, when the HUD shown in FIG. 1 is used, in a state where the line of sight is out of the projection surface 2, it is possible to reduce the visibility, for example, brightness. In a case where a method for controlling the intensity of light emitted from a light source is employed for the reduction of the brightness, it is possible to reduce power consumption or heat generation of the HUD.

In addition, in the HUD shown in FIG. 1, only in a case where the line of sight of the driver enters the projection surface 2 from the state of being out of the projection surface 2 and the state where the line of sight is within the projection surface 2 is continued for the second time (YES in step S9), the projection condition of the light onto the projection surface 2 is changed after the first time elapses.

Thus, in a situation where the driver rapidly moves the line of sight, it is possible to prevent the projection condition from being frequently switched. Accordingly, it is possible to enhance durability of the HUD, and to enhance a feeling of a driver or passengers in using the HUD. The second time may be a period of time during which it is possible to determine that the line of sight becomes stable. The second time may be experimentally determined, or may be a value that is changed in real time on the basis of a history of the line of sight of the driver.

In FIG. 5, when the determination in step S7 is YES, the procedure may immediately proceed to step S10. In this case, step S8 is deleted. Further, when the determination in step S7 is NO, the procedure proceeds to the process of step S1. Further, in this case, it is preferable to set the first time to about 1 second to 5 seconds. Even in such an operation, when the line of sight moves from the outside of the projection surface 2 to the inside of the projection surface 2, a virtual image with high visibility is not immediately presented to the driver. Thus, it is possible to prevent a situation where the driver focuses on a virtual image to hardly pay attention to the background, and thus, to accurately recognize a situation in a traveling direction.

Further, in step S12 in FIG. 5, the system controller 60 may change the projection condition to the second condition without waiting for the elapse of the first time from the process of step S10.

In a case where the projection condition is changed to the second condition, projection light is projected onto the projection surface 2 according to the second condition, and it takes a slight time until a driver can visually recognize a virtual image based on the projection light. Since the virtual image with low visibility is visually recognizable during this time, it is possible to prevent a situation where the driver focuses on a virtual image to hardly pay attention to the background, and thus, to accurately recognize a situation in a traveling direction.

Further, even in a case where the slight time is a very short time, by dividing the second condition into a plurality of sub conditions, and by first setting a sub condition (a) having the lowest visibility, it is possible to reduce change in visibility of a virtual image due to instant switching of the projection condition. As a result, it is possible to prevent a situation where the driver focuses on a virtual image to hardly pay attention to the background, and thus, to accurately recognize a situation in a traveling direction.

It is preferable that the first time in step S12 in FIG. 5 may be manually set. Specifically, a display restarting time setting screen may be displayed on the display (touch panel) that is the operation unit 80, and the first time may be arbitrarily set by a button operation on the screen. Here, the shortest time (for example, 1 second) of the first time is determined in advance, and the first time cannot be set to a time shorter than the shortest time. With this configuration, it is possible to prevent a projection condition of an image from being changed immediately after it is determined that a line of sight of a driver is within a projection range of light.

Further, when used to the HUD shown in FIG. 1, in a case where the projection condition is changed from the first condition to the second condition, since visibility of a virtual image gradually becomes higher with the lapse of time, it is possible to cause the virtual image to return to a state where its visibility becomes maximum naturally.

Which one of the brightness, the saturation, the size, the distance, and the position shown in FIG. 3 is to be set as the projection condition may be manually determined by a user of the HUD.

For example, a screen as shown in FIG. 3 may be displayed on the display (with touch panel) of the operation unit 80, and one of the brightness, the saturation, the size, the distance, and the position may be selected.

The operation unit 80 is configured by a display (for example, a display with a touch panel disposed in a center console) mounted in an automobile, operation buttons, and the like, but a configuration in which a communication unit that communicates with an electronic device possessed by a driver or passenger is provided in an automobile and a signal operated by the electronic device is received through the communication unit and is output to the system controller 60 may be used. The communication unit may be provided in the HUD.

The electronic device may be a portable type computer such as a smartphone, a cellular phone with a camera, a tablet terminal (personal digital assistant), and may be any device that can display an operation screen shown in FIG. 3 and can receive input of a variety of information. With this configuration, it is possible to perform the same operation as the operation unit 80.

In HUD in FIG. 1, an optical system optically designed so that an image based on light projected onto the projection surface 2 can be visually recognized by a driver as a real image on the projection surface 2 may be used as the projection unit 50. In this case, similarly, in a case where the driver moves the line of sight from the outside of the projection surface 2 to the inside of the projection surface 2, in a case where the driver views a real image of which visibility becomes maximum, it is difficult for the driver to accurately recognize a situation in a traveling direction, and thus, it is effective to apply the invention thereto.

As described above, the following items are disclosed in this specification.

A disclosed projection type display device includes: a projection display unit that includes a light source, a light modulation element that spatially modulates light emitted from the light source, and a projection unit that projects light spatially modulated by the light modulation element onto a projection surface mounted in a vehicle as projection light; a sight line detection unit that detects a line of sight of a driver of the vehicle; and a projection controller that performs a control so that a projection condition for the projection of the projection light onto the projection surface in the projection display unit becomes a first condition in a case where the line of sight detected by the sight line detection unit is out of the projection surface, and performs a control so that the projection condition becomes a second condition that visibility of an image based on the projection light is higher than that in the first condition in a case where it is determined that the line of sight detected by the sight line detection unit moves from the outside of the projection surface to the inside of the projection surface.

The disclosed projection type display device is configured so that the second condition includes a plurality of sub conditions having different visibilities of the image and the projection controller sequentially changes the projection condition from a sub condition having a low visibility to a sub condition having a high visibility in a case where it is determined that the line of sight detected by the sight line detection unit moves from the outside of the projection surface to the inside of the projection surface.

The disclosed projection type display device is configured so that the projection condition is at least one of brightness, saturation, or the size of an image based on the projection light and the first condition is a condition that the brightness, the saturation, or the size is smaller than that in the second condition.

The disclosed projection type display device is configured so that the projection condition is a distance from the projection surface of a virtual image formed by the projection light and the first condition is a condition that the distance is larger than that in the second condition.

The disclosed projection type display device is configured so that the projection condition is the position of the image based on the projection light and the first condition is a condition in which the position of the image is close to an end portion side of the projection surface compared with that in the second condition.

The disclosed projection type display device is configured so that the projection controller changes the projection condition from the first condition to the second condition after a first time elapses from a point in time when it is determined that the line of sight detected by the sight line detection unit moves from the outside of the projection surface to the inside of the projection surface.

The disclosed projection type display device is configured so that the first time is manually settable.

The disclosed projection type display device is configured so that the projection controller determines that the line of sight moves from the outside of the projection surface to the inside of the projection surface in a case where the line of sight detected by the sight line detection unit moves from a state where the line of sight detected by the sight line detection unit is out of the projection surface to a state where the line of sight detected by the sight line detection unit is within the projection surface and the line of sight detected by the sight line detection unit is continuously within the projection surface for a second time.

The disclosed projection type display device is configured so that the projection condition is manually settable.

A disclosed projection control method in a projection type display device including a projection display unit that includes a light source, a light modulation element that spatially modulates light emitted from the light source, and a projection unit that projects light spatially modulated by the light modulation element onto a projection surface mounted in a vehicle as projection light; and a sight line detection unit that detects a line of sight of a driver of the vehicle, includes: a projection control step of performing a control so that a projection condition for the projection of the projection light onto the projection surface in the projection display unit becomes a first condition in a case where the line of sight detected by the sight line detection unit is out of the projection surface, and performing a control so that the projection condition becomes a second condition that visibility of an image based on the projection light is higher than that in the first condition in a case where it is determined that the line of sight detected by the sight line detection unit moves from the outside of the projection surface to the inside of the projection surface.

The disclosed projection control method is configured so that the second condition includes a plurality of sub conditions having different visibilities of the image, and in the projection control step, in a case where it is determined that the line of sight detected by the sight line detection unit moves from the outside of the projection surface to the inside of the projection surface, the projection condition is sequentially changed from a sub condition with a low visibility to a sub condition with a high visibility.

The disclosed projection control method is configured so that the projection condition is at least one of brightness, saturation, or the size of an image based on the projection light and the first condition is a condition that at least one of the brightness, the saturation, or the size is smaller than that in the second condition.

The disclosed projection control method is configured so that the projection condition is a distance from the projection surface of a virtual image visually recognized by the projection light and the first condition is a condition that the distance is larger than that in the second condition.

The disclosed projection control method is configured so that the projection condition is the position of the image based on the projection light and the first condition is a condition in which the position of the image is close to an end portion side of the projection surface compared with that in the second condition.

The disclosed projection control method is configured so that, in the projection control step, the projection condition is changed from the first condition to the second condition after a first time elapses from a point in time when it is determined that the line of sight detected by the sight line detection unit moves from the outside of the projection surface to the inside of the projection surface.

The disclosed projection control method is configured so that, in the projection control step, it is determined that the line of sight moves from the outside of the projection surface to the inside of the projection surface in a case where the line of sight detected by the sight line detection unit moves from a state where the line of sight detected by the sight line detection unit is out of the projection surface to a state where the line of sight detected by the sight line detection unit is within the projection surface and the line of sight detected by the sight line detection unit is continuously within the projection surface for a second time.

The projection type display device of the invention is particularly mounted in an automobile, which provides high comfort and effectiveness.

EXPLANATION OF REFERENCES

2: projection surface
10: imaging unit
40: light source unit
44: light modulation element
45: driving unit
50: projection unit
60: system controller
70: sight line detection unit

What is claimed is:
1. A projection type display device comprising:
a projection display unit that includes a light source, a light modulation element that spatially modulates light emitted from the light source, and a projection unit that projects light spatially modulated by the light modulation element onto a projection surface mounted in a vehicle as projection light;
a sight line detection unit that detects a line of sight of a driver of the vehicle; and
a projection controller that performs a control so that a projection condition for the projection of the projection light onto the projection surface in the projection display unit becomes a first condition in a case where the line of sight detected by the sight line detection unit is out of the projection surface, and performs a control so that the projection condition becomes a second condition in a case where it is determined that the line of sight detected by the sight line detection unit has been moved from the outside of the projection surface to the inside of the projection surface,
wherein the projection controller changes the projection condition from the first projection condition to the second projection condition in which visibility of an image based on the projection light is higher than that in the first condition by decreasing a distance from the projection surface of a virtual image formed by the projection light, after a first period of time ranging between 1 and 4 seconds elapses from a point in time when the projection controller determines that the line of sight is detected by the sight line detection unit to have been moved from the outside of the projection surface to the inside of the projection surface.

2. The projection type display device according to claim 1,
wherein the second condition includes a plurality of sub conditions having different visibilities of the image, and
the projection controller sequentially changes the projection condition from a sub condition having a lower visibility to a sub condition having a higher visibility by further decreasing the distance from the projection surface of the virtual image formed by the projection light in a case where it is determined that the line of sight detected by the sight line detection unit has been moved from the outside of the projection surface to the inside of the projection surface.

3. The projection type display device according to claim 2,
wherein the first period of time is manually settable to be between 1 second to 4 seconds in advance.

4. The projection type display device according to claim 1,
wherein the first period of time is manually settable to be between 1 second to 4 seconds in advance.

5. The projection type display device according to claim 1,
wherein the projection controller determines that the line of sight has been moved from the outside of the projection surface to the inside of the projection surface in a case where the line of sight detected by the sight line detection unit changes from a state where the line of sight detected by the sight line detection unit is out of the projection surface moves to a state where the line of sight detected by the sight line detection unit is within the projection surface and the line of sight is detected by the sight line detection unit have bee continuously within the projection surface for a second period of time.

6. A projection type display device comprising:
a projection display unit that includes a light source, a light modulation element that spatially modulates light emitted from the light source, and a projection unit that projects light spatially modulated by the light modulation element onto a projection surface mounted in a vehicle as projection light;
a sight line detection unit that detects a line of sight of a driver of the vehicle; and
a projection controller that performs a control so that a projection condition for the projection of the projection light onto the projection surface in the projection display unit becomes a first condition in a case where the line of sight detected by the sight line detection unit is out of the projection surface, and performs a control so that the projection condition becomes a second condition in a case where it is determined that the line of sight detected by the sight line detection unit has been moved from the outside of the projection surface to the inside of the projection surface,
wherein the projection controller changes the projection condition from the first projection condition to the second projection condition in which visibility of an image based on the projection light is higher than that in the first condition by increasing a distance of a position of the image based on the projection light from an end portion side of the projection surface, after a first period of time ranging between 1 and 4 seconds elapses from a point in time when the projection controller determines that the line of sight is detected by the sight line detection unit to have been moved from the outside of the projection surface to the inside of the projection surface.

7. The projection type display device according to claim 6,
wherein the second condition includes a plurality of sub conditions having different visibilities of the image, and
the projection controller sequentially changes the projection condition from a sub condition having a lower visibility to a sub condition having a higher visibility by further increasing the distance of the position of the image based on the projection light from an end portion side of the projection surface in a case where it is determined that the line of sight detected by the sight line detection unit has been moved from the outside of the projection surface to the inside of the projection surface.

8. The projection type display device according to claim 7,
wherein the first period of time is manually settable to be between 1 second to 4 seconds in advance.

9. The projection type display device according to claim 6,
wherein the first period of time is manually settable to be between 1 second to 4 seconds in advance.

10. The projection type display device according to claim 6,
wherein the projection controller determines that the line of sight has been moved from the outside of the projection surface to the inside of the projection surface in a case where the line of sight detected by the sight line detection unit changes from a state where the line of sight detected by the sight line detection unit is out of the projection surface to a state where the line of sight detected by the sight line detection unit is within the projection surface and the line of sight is detected by the sight line detection unit to have been continuously within the projection surface for a second period of time.

11. A projection control method in a projection type display device including a projection display unit that includes a light source, a light modulation element that spatially modulates light emitted from the light source, and a projection unit that projects light spatially modulated by the light modulation element onto a projection surface mounted in a vehicle as projection light; and a sight line detection unit that detects a line of sight of a driver of the vehicle, the method comprising:
a projection control step of performing a control so that a projection condition for the projection of the projection light onto the projection surface in the projection display unit becomes a first condition in a case where the line of sight detected by the sight line detection unit is out of the projection surface, and performing a control so that the projection condition is changed from the first condition to a second condition in which visibility of an image based on the projection light is higher than that in the first condition by decreasing a distance from the projection surface of a virtual image formed by the projection light, in a case where it is determined that the line of sight detected by the sight line detection unit moves has been moved from the outside of the projection surface to the inside of the projection surface, after a first period of time ranging between 1 and 4 seconds elapses from a point in time when the projection controller determines that the line of sight is detected by the sight line detection unit to have been moved from the outside of the projection surface to the inside of the projection surface.

12. The projection control method according to claim 11, wherein the second condition includes a plurality of sub conditions having different visibilities of the image, and in the projection control step, in a case where it is determined that the line of sight detected by the sight line detection unit has been moved from the outside of the projection surface to the inside of the projection surface, the projection condition is sequentially changed from a sub condition with a lower visibility to a sub condition with a higher visibility by further decreasing the distance from the projection surface of the virtual image formed by the projection light.

13. The projection control method according to claim 11, wherein, in the projection control step, it is determined that the line of sight has been moved from the outside of the projection surface to the inside of the projection surface in a case where the line of sight detected by the sight line detection unit changes from a state where the line of sight detected by the sight line detection unit is out of the projection surface moves to a state where the line of sight detected by the sight line detection unit is within the projection surface and the line of sight is detected by the sight line detection unit to have been continuously within the projection surface for a second period of time.

14. A projection control method in a projection type display device including a projection display unit that includes a light source, a light modulation element that spatially modulates light emitted from the light source, and a projection unit that projects light spatially modulated by the light modulation element onto a projection surface mounted in a vehicle as projection light; and a sight line detection unit that detects a line of sight of a driver of the vehicle, the method comprising:

a projection control step of performing a control so that a projection condition for the projection of the projection light onto the projection surface in the projection display unit becomes a first condition in a case where the line of sight detected by the sight line detection unit is out of the projection surface, and performing a control so that the projection condition is changed from the first condition to a second condition in which visibility of an image based on the projection light is higher than that in the first condition by increasing a distance of a position of the image based on the projection light from an end portion side of the projection surface, in a case where it is determined that the line of sight detected by the sight line detection unit has been moved from the outside of the projection surface to the inside of the projection surface, after a first period of time ranging between 1 and 4 seconds elapses from a point in time when the projection controller determines that the line of sight is detected by the sight line detection unit to have been moved from the outside of the projection surface to the inside of the projection surface.

15. The projection control method according to claim 14, wherein the second condition includes a plurality of sub conditions having different visibilities of the image, and in the projection control step, in a case where it is determined that the line of sight detected by the sight line detection unit has been moved from the outside of the projection surface to the inside of the projection surface, the projection condition is sequentially changed from a sub condition with a lower visibility to a sub condition with a higher visibility by further increasing the distance of the position of the image based on the projection light from the end portion side of the projection surface.

16. The projection control method according to claim 14, wherein, in the projection control step, it is determined that the line of sight has been moved from the outside of the projection surface to the inside of the projection surface in a case where the line of sight detected by the sight line detection unit changes from a state where the line of sight detected by the sight line detection unit is out of the projection surface moves to a state where the line of sight detected by the sight line detection unit is within the projection surface and the line of sight is detected by the sight line detection unit to have been continuously within the projection surface for a second period of time.

* * * * *